(12) United States Patent
Sugaya

(10) Patent No.: US 10,296,280 B2
(45) Date of Patent: May 21, 2019

(54) CAPTURED IMAGE SHARING SYSTEM, CAPTURED IMAGE SHARING METHOD AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 16/048,497

(22) Filed: Jul. 30, 2018

(65) Prior Publication Data

US 2018/0335999 A1    Nov. 22, 2018

Related U.S. Application Data

(63) Continuation-in-part of application No. PCT/JP2016/066037, filed on May 31, 2016.

(51) Int. Cl.
*G06F 3/01* (2006.01)
*G06F 3/14* (2006.01)
*H04N 1/00* (2006.01)

(52) U.S. Cl.
CPC ........... *G06F 3/1454* (2013.01); *G06F 3/013* (2013.01); *H04N 1/00129* (2013.01); *H04N 1/00209* (2013.01)

(58) Field of Classification Search
None
See application file for complete search history.

(56) References Cited

U.S. PATENT DOCUMENTS

| 2013/0176208 A1* | 7/2013 | Tanaka | G06F 3/013 345/156 |
| 2013/0271454 A1 | 10/2013 | Lyons et al. | |
| 2017/0053446 A1* | 2/2017 | Chen | G06T 19/006 |

FOREIGN PATENT DOCUMENTS

| JP | 09-154124 | 6/1997 |
| JP | 2005-250734 | 9/2005 |
| JP | 2010-210822 | 9/2010 |
| JP | 2011-253324 | 12/2011 |
| JP | 2013-54631 | 3/2013 |
| JP | 2014-532206 | 12/2014 |
| JP | 2015-43538 | 3/2015 |
| JP | 2015-82729 | 4/2015 |

OTHER PUBLICATIONS

English machine translation of Japanese patent publication JP-2005-250734.*

* cited by examiner

*Primary Examiner* — Nicholas J Lee
(74) *Attorney, Agent, or Firm* — Lex IP Meister, PLLC

(57) ABSTRACT

A captured image sharing system 1 that shares a captured image captured by an information terminal 100 with an operator terminal 200 connected via a network accepts a designation for a device appearing on a captured image displayed by the operator terminal 200, specifies the device for which the designation has been accepted, and displays device information of the specified device on the operator terminal 200.

9 Claims, 5 Drawing Sheets

CAPTURED IMAGE SHARING SYSTEM, CAPTURED IMAGE SHARING METHOD AND PROGRAM

CROSS-REFERENCE TO RELATED APPLICATION

This application is a continuation-in-part of PCT Application No. PCT/JP2016/066037 filed on May 31, 2016, the entire contents of which are incorporated herein by reference.

BACKGROUND

(a) Field

The present invention relates to a captured image sharing system, a captured image sharing method, and a program for sharing a captured image captured by an information terminal with an operator terminal connected via a network.

(b) Description of the Related Art

In recent years, an information terminal operated by a user and an operator terminal operated by an operator are connected via a network so as to share a screen in real time. In such screen sharing, the operator issues an instruction based on a screen viewed by the user, by displaying an image displayed by the information terminal on the operator terminal as well.

Further, a configuration is disclosed in which various information such as functions related to a plurality of parts of a target device, an operation method, and the like are displayed for each part based on an image or the like representing the appearance of the target device.

However, Japanese Patent Application Publication No. 2015-43538 discloses the configuration in which all the feature amounts included in the image are extracted, and the contents associated with the feature amounts and image are displayed. For this reason, if the image is shared between the information terminal and the operator terminal, there is a possibility that the content which is not desired by the operator is displayed and it is difficult for the operator to issue an appropriate instruction. As such, there is a technical problem in the existing technology related to the captured image sharing that the convenience of the captured image sharing system is low because the content which is not desired by the operator is displayed so it is difficult for the operator to issue the appropriate instruction for the desired content.

SUMMARY

An aspect of the present invention provides a captured image sharing system, a captured image sharing method, and a program for improving the convenience.

A first aspect of the present invention provides a captured image sharing system that shares a captured image captured by an information terminal with an operator terminal connected via a network. The captured image sharing system includes a device designation accepting unit that accepts a designation for a device appearing on a captured image displayed by the operator terminal, a device specifying unit that specifies the device for which the designation has been accepted, and a first device information display unit that displays device information of the specified device on the operator terminal.

According to the first aspect of the present invention, a captured image sharing system that shares a captured image captured by an information terminal with an operator terminal connected via a network accepts a designation for a device appearing on a captured image displayed by the operator terminal, specifies the device for which the designation has been accepted, and displays device information of the specified device on the operator terminal.

The invention according to the first aspect is a category of a captured image sharing system, but exhibits the same action and effect corresponding to the category even in other categories such as a method, a program, and the like.

A second aspect of the present invention provides the captured image sharing system which is the invention according to the first aspect, wherein the device designation accepting unit accepts the designation for the device by recognizing a line of sight.

According to the second aspect of the present invention, the captured image sharing system, which is the invention according to the first aspect, accepts the designation for the device by recognizing a line of sight.

A third aspect of the present invention provides the captured image sharing system which is the invention according to the first aspect, wherein the device designation accepting unit accepts the designation for the device by recognizing an operation.

According to the third aspect of the present invention, the captured image sharing system, which is the invention according to the first aspect, accepts the designation for the device by recognizing an operation.

A fourth aspect of the present invention provides the captured image sharing system which is the invention according to the first aspect, wherein the device specifying unit specifies the device for which the designation has been accepted by image recognition.

According to the fourth aspect of the present invention, the captured image sharing system, which is the invention according to the first aspect, specifies the device for which the designation has been accepted by image recognition.

A fifth aspect of the present invention provides the captured image sharing system which is the invention according to the first aspect, wherein the device specifying unit specifies the device for which the designation has been accepted by reading an information code provided in the device.

According to the fifth aspect of the present invention, the captured image sharing system, which is the invention according to the first aspect, specifies the device for which the designation has been accepted by reading an information code provided in the device.

A sixth aspect of the present invention provides the captured image sharing system which is the invention according to the first aspect, further includes a second device information display unit that displays the specified device information on the information terminal.

According to the sixth aspect of the present invention, the captured image sharing system, which is the invention according to the first aspect, displays the specified device information on the information terminal.

A seventh aspect of the present invention provides a captured image sharing method that shares a captured image captured by an information terminal with an operator terminal connected via a network, the method including accepting a designation for a device appearing on a captured image displayed by the operator terminal, specifying the device for which the designation has been accepted, and displaying device information of the specified device on the operator terminal.

An eighth aspect of the present invention provides a program for causing a captured image sharing system that shares a captured image captured by an information terminal with an operator terminal connected via a network to execute accepting a designation for a device appearing on a captured image displayed by the operator terminal, specifying the device for which the designation has been accepted, and displaying device information of the specified device on the operator terminal.

An ninth aspect of the present invention provides a captured image sharing system that shares a captured image captured by an information terminal with an operator terminal connected via a network, the captured image sharing system including a device designation accepting unit that recognizes a line of sight of an operator for a device appearing on a captured image displayed by the operator terminal, and accepts a designation for a part or a whole of the device in accordance with whether the line of sight stays at a specific portion of the device for a predetermined time, a device specifying unit that specifies the device for which the designation has been accepted, and a first device information display unit that displays device information of the specified device on the operator terminal.

According to ninth aspect of the present invention, because the designation is determined in accordance with a portion of the device at which the line of sight of the operator has stayed for a predetermined time, the content which is not desired by the operator can be prevented from being designated so that the operator can easily issue an appropriate instruction for the desired content. Accordingly, the ninth aspect of the present invention can provide a technical solution for allowing the operator to easily issue an appropriate instruction for the desired content, thereby improving the captured image sharing system.

According to an aspect of the present invention, a captured image sharing system, a captured image sharing method, and a program for improving the convenience can be provided.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Captured Image Sharing System 1

Figure 1:
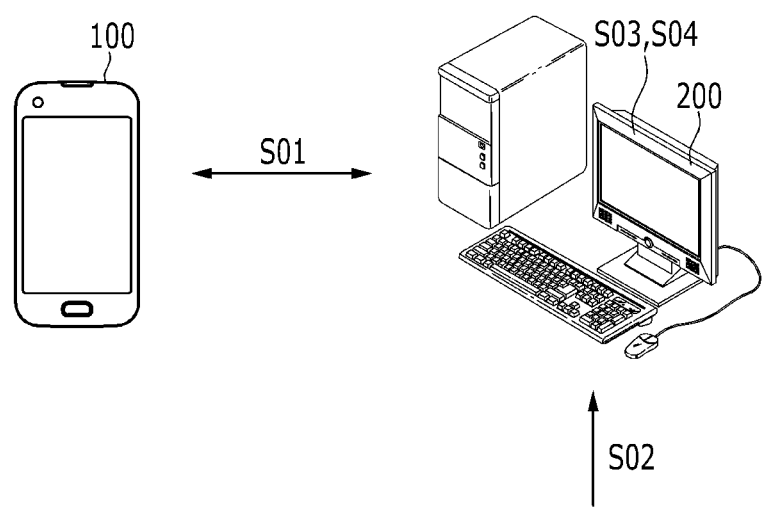
FIG. 1 is a diagram showing an overview of a captured image sharing system 1.

An overview of a captured image sharing system according to an embodiment of the present invention is described with reference to FIG. 1. FIG. 1 is a diagram for explaining an overview of a captured image sharing system 1 according to an embodiment of the present invention. The captured image sharing system 1 includes an information terminal 100 and an operator terminal 200. The number of information terminal(s) 100 and the number of operator terminal(s) 200 are not limited to one but may be two or more. Further, each process to be described later may be realized by either the information terminal 100 or the operator terminal 200, or both the information terminal 100 and the operator terminal 200. Furthermore, the information terminal 100 or the operator terminal 200 may be realized by either an existing device or a virtual device, or both the existing device and the virtual device.

The information terminal 100 is a terminal device that is connected to the operator terminal 200 so as to enable data communication and is operated by a user. The information terminal 100 is, for example, an electric appliance such as a mobile phone, a portable information terminal, a tablet terminal, a personal computer, a netbook terminal, a slate terminal, an electronic dictionary terminal, a portable music player, or the like, a wearable terminal such as smart glasses, a head mounted display, or the like, or other goods. In the present embodiment, the portable information terminal is described as an example of the information terminal 100.

The operator terminal 200 is a terminal device that is connected to the information terminal 100 so as to enable data communication and is operated by an operator. The operator terminal 200 is the electric appliance, the wearable terminal, or other goods, like the information terminal 100. In the present embodiment, the personal computer is described as an example of the operator terminal 200.

First, the information terminal 100 and the operator terminal 200 start a network connection relating to image sharing, and share an image such as a moving image or a still image captured by the information terminal 100 with each other (step S01). For example, the information terminal 100 and the operator terminal 200 display the same image, by sharing captured image data captured by the information terminal 100 or by sharing screen data of a screen captured by an image capturing device such as a camera or the like of the information terminal 100.

The operator terminal 200 accepts, from the operator, an designation input for a device appearing on the shared captured image (step S02). For example, the operator terminal 200 recognizes a line of sight of the operator and determines that the operator has designated a part or the whole of the device. Further, the operator terminal 200 recognizes an operation input by, for example, a touch panel, a keyboard, or the like from the operator, and determines that the operator has designated a part or the whole of the device. The acceptance of the designation may be either the part or the whole of the device, or both the part and the whole of the device. Further, the designation by the operation may be implemented by other configurations.

The operator terminal 200 specifies the device for which the designation has been accepted (step S03). For example, the operator terminal 200 recognizes the captured image to be displayed and extracts a feature amount of the device on which the designation is accepted. The operator terminal 200 specifies product information associated with this feature amount based on the extracted feature amount and feature quantity amounts which are stored in a database or the like in advance to specify the product information of this device. Further, the operator terminal 200 reads, for example, an information code such as a one-dimensional code or a two-dimensional code provided in the device for which the designation has been accepted, and specifies product information associated with the information code, which is stored in a database or the like in advance. The product information is, for example, a development company, a sales company, a name, a model, or the like of the device.

The operator terminal 200 acquires device information from a database or the like based on the product information of the specified device, and displays the device information on its own display unit (step S04). The device information is, for example, a manual related to a description, an operation method or the like of the device, past operation history of the device, or the like. At this time, the operator terminal 200 may share the acquired device information with the information terminal 100. For example, the device information specified and displayed by the operator terminal 200 may also be displayed on the information terminal 100.

In the above description, the information terminal 100 and the operator terminal 200 constitute the captured image sharing system 1, but a server may be added to the captured image sharing system 1. In this case, the server executes the processing of the steps S03 and S04 described above. That is, the server specifies the device and acquires the device information. The server transmits the acquired device information to the information terminal 100 and the operator terminal 200, and causes the display unit of each of the information terminal 100 and the operator terminal 200 to display the device information. Further, the server may be configured to execute other processing.

The above is the overview of the captured image sharing system 1.

System Configuration of Captured Image Sharing System 1

Figure 2:
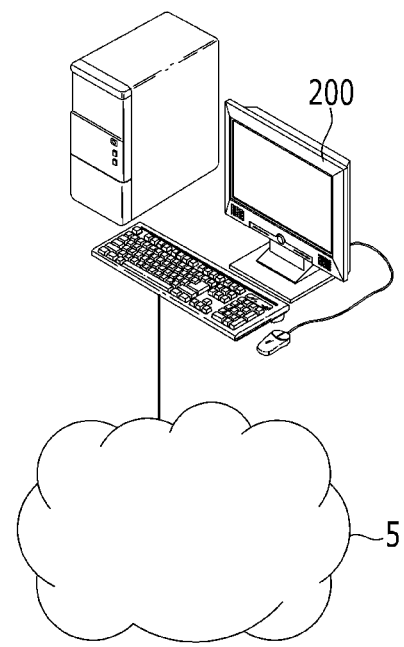
FIG. 2 is a diagram showing a system configuration of a captured image sharing system 1.
Figure 2:
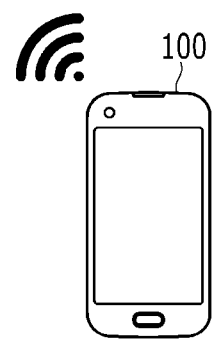

A system configuration of a captured image sharing system 1 according to an embodiment of the present invention is described with reference to FIG. 2. FIG. 2 is a diagram showing a system configuration of a captured image sharing system 1 according to an embodiment of the present invention. In FIG. 2, the captured image sharing system 1 includes an information terminal 100, an operator terminal 200, a public line network (an Internet network, a third or fourth generation communication network, or the like) 5. The number of information terminal(s) 100 and the number of operator terminal(s) 200 are not limited to one but may be two or more. Further, each process to be described later may be realized by either the information terminal 100 or the operator terminal 200, or both the information terminal 100 and the operator terminal 200. Furthermore, each device may be realized by either an existing device or a virtual device, or both the existing device and the virtual device.

The information terminal 100 is the above-described terminal device having functions to be described later.

The operator terminal 200 is the above-described terminal device having functions to be described later.

Description of Each Function

Figure 3:
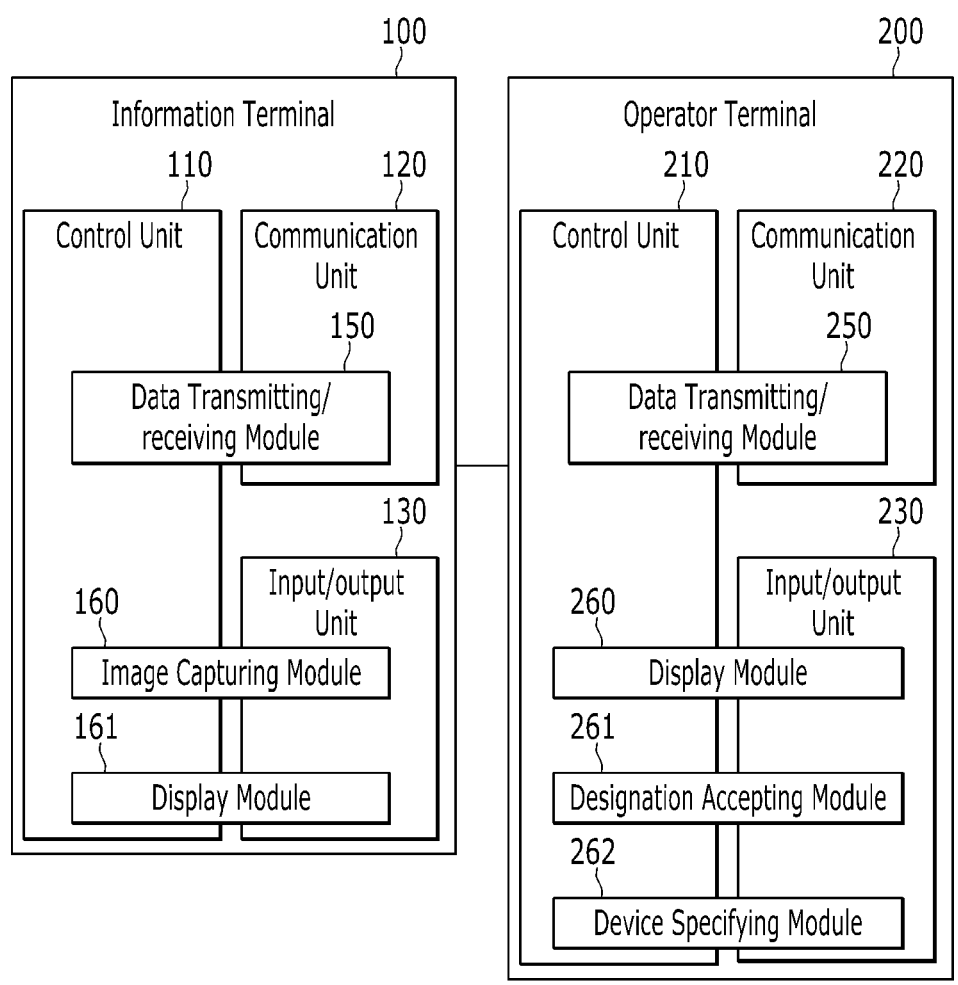
FIG. 3 is a functional block diagram of an information terminal 100 and an operator terminal 200.

Functions of a captured image sharing system 1 are described with reference to FIG. 3. FIG. 3 is a functional block diagram of an information terminal 100 and an operator terminal 200 according to an embodiment of the present invention.

The information terminal 100 includes, as a control unit 110, a processor such as a CPU (Central Processing Unit), a RAM (Random Access Memory), a ROM (Read Only Memory), and the like. The information terminal 100 includes, as a communication unit 120, a communication device for enabling communication with another device, for example, a WiFi (Wireless Fidelity) compliant device conforming to IEEE 802.11. In addition, the information terminal 100 includes, as an input/output unit 130, a display device for outputting and displaying data or images controlled by the control unit 110, an input device such as a touch panel, a keyboard, or a mouse, for accepting an input from the user, an image capturing device for capturing an image such as a moving image or a still image, and the like.

In the information terminal 100, the control unit 110 reads a predetermined program, thereby realizing a data transmitting/receiving module 150 in cooperation with the communication unit 120. In addition, in the information terminal 100, the control unit 110 reads a predetermined program, thereby realizing an image capturing module 160 and a display module 161 in cooperation with the input/output unit 130.

Like the information terminal 100, the operator terminal 200 includes a processor such as a CPU, a RAM, a ROM, and the like as the control unit 210, and a communication device for enabling communication with another device or the like as the communication unit 220. The operator terminal 200 includes a display device, an input device, an image capturing device, a detecting device for detecting a line of sight, an image recognition device for executing image recognition, or the like, as an input/output unit 230.

In the operator terminal 200, the control unit 210 reads a predetermined program, thereby realizing a data transmitting/receiving module 250 in cooperation with the communication unit 220. Further, in the operator terminal 200, the control unit 210 reads a predetermined program, thereby realizing a display module 260, a designation accepting module 261, and a device specifying module 262 in cooperation with the input/output unit 230.

Captured Image Sharing Process

Figure 4:
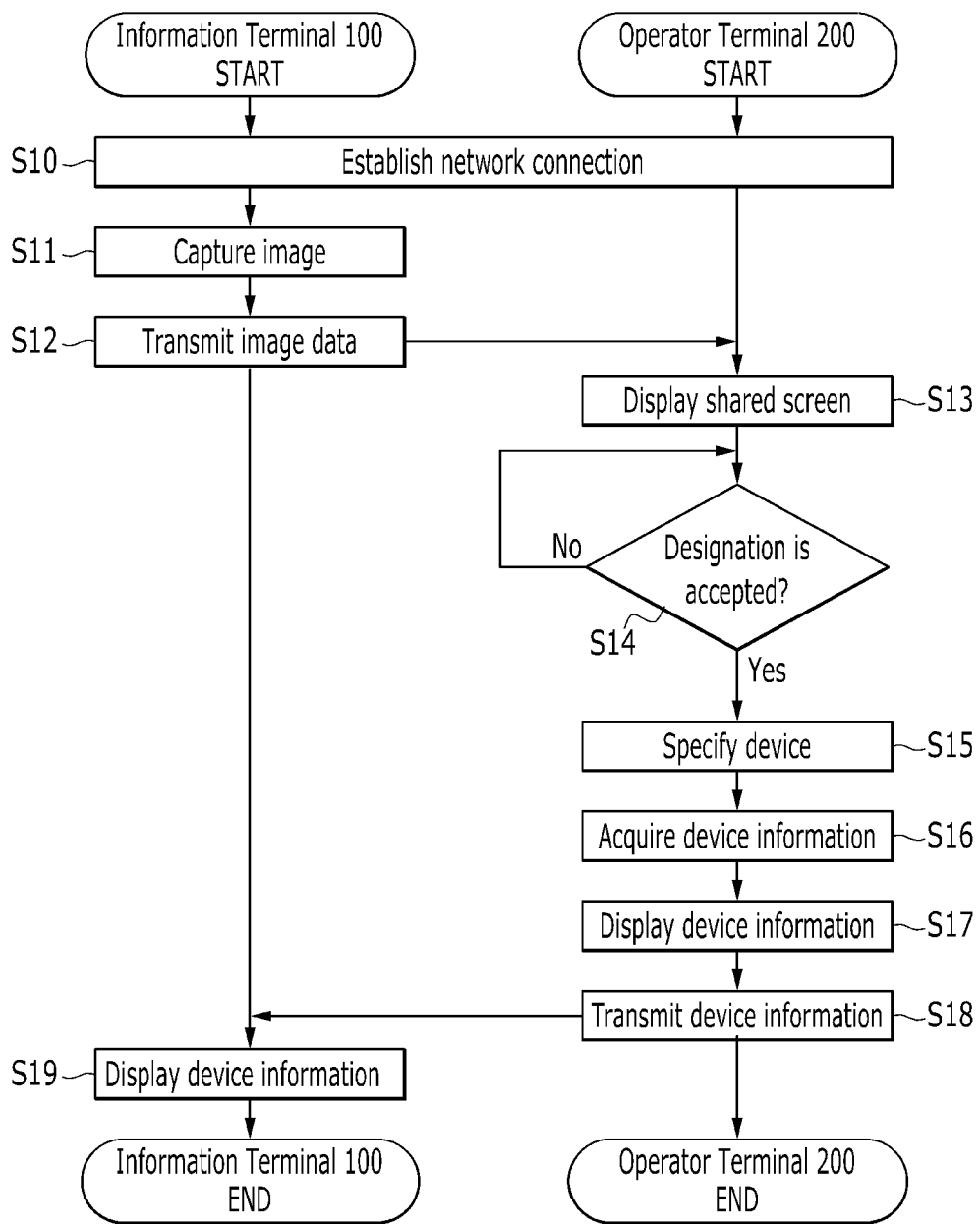
FIG. 4 is a flowchart showing a captured image sharing process executed by an information terminal 100 and an operator terminal 200.

A captured image sharing process executed by a captured image sharing system 1 is described with reference to FIG. 4. FIG. 4 is a flowchart showing a captured image sharing process executed by an information terminal 100 and an operator terminal 200 according to an embodiment of the present invention. The processing executed by modules of each device described above is described together with the present processing.

First, the information terminal 100 and the operator terminal 200 establish a network connection related to sharing of captured images (step S10). In step S10, the network connection is established as in the network connection related to general screen sharing. That is, the network connection is a network connection for displaying a captured image displayed on a screen of the information terminal 100 on a screen sharing area which is set in a part or the whole of a display unit of the operator terminal 200.

An image capturing module 160 captures an image such as a moving image or a still image (step S11). In step S11, the image capturing module 160 accepts an input from a user and captures an image of a part or the whole of a target device.

A data transmitting/receiving module 150 transmits image data of the captured image to the operator terminal 200 (step S12). In step S12, the image data are not limited to the actually captured image data, and the data transmitting/receiving module 150 may transmit, as image data, a captured image which the image capturing module 160 displays on a display unit.

A data transmitting/receiving module 250 receives the image data. A display module 260 shares the captured image captured by the information terminal 100 based on the image data and displays the captured image as a shared screen (step S13). In step S13, the display module 260 sets a partial area or the whole area of its own display unit as a screen sharing area for displaying the captured image, and displays the captured image in the screen sharing area. The screen sharing area may be set to be variable according to a resolution of image data or the like. In addition, the display module 260 may change the resolution of the image data in accordance with the screen sharing area and display the captured image by enlarging or reducing the captured image.

A designation accepting module 261 determines whether or not a designation has been accepted for a device appearing on the shared screen (step S14). In step S14, the designation accepting module 261 accepts the designation for the device by accepting an input such as a line of sight, an operation of the operator, or the like.

In step S14, the designation accepting module 261 recognizes the line of sight of the operator based on positions of an iris and an inner corner of the operator or positions of a pupil and a corneal reflection of the operator. The designation acceptance module 261 determines that the designation has been accepted for a part or the whole of the device existing at an end of the accepted line of sight of the operator. For example, when the line of sight of the operator has stayed at a specific portion of the device for a predetermined time, the designation accepting module 261 determines that the designation of this specific portion has been accepted. Further, when the line of sight of the operator has stayed at a plurality of portions for a predetermined time, the designation accepting module 261 determines that the designation of each of the plurality of portions has been accepted. Further, when the line of sight of the operator is directed to the plurality of portions or the whole of the device without staying for a predetermined period of time, the designation accepting module 261 determines that the designation of this device itself has been accepted. As such, because the designation is determined in accordance with a portion of the device at which the line of sight of the operator has stayed for a predetermined time, the content which is not desired by the operator can be prevented from being designated so that the operator can issue an appropriate instruction and the convenience of the captured image sharing system can be improved. In other words, the existing technology related to the captured image sharing can be improved.

In addition, in step S14, the designation accepting module 261 recognizes the operation of the operator based on an operation input such as tapping or clicking of the operator. The designation accepting module 261 determines that designation has been accepted for a part or the whole of the device designated by the accepted operation input. For example, when the operator taps a specific portion of the device, the designation accepting module 261 determines that the designation of this specific portion has been accepted. In addition, when the designation accepting module 261 accepts an operation input that taps a plurality of portions of the device or encloses the plurality of portions with a shape such as a circle or a rectangle, the designation accepting module 261 determines that the designation of the plurality of portions has been accepted. Further, when accepting the operation input that taps or encloses the whole device, the designation accepting module 261 determines that the designation of this device itself has been accepted. Furthermore, the designation accepting module 261 may accept the designation of the device by other configurations.

Moreover, the designation receiving module 261 may accept the designation of the device by other configurations.

In step S14, when the designation accepting module 261 determines that the designation has not been accepted (NO in step S14), the designation accepting module 261 repeats this processing until it accepts the designation.

On the other hand, if it is determined in step S14 that the designation has been accepted (YES in step S14), the device specifying module 262 specifies the device for which the designation has been accepted (step S15). In step S15, the device specifying module 262 specifies product information such as a development company, a sales company, a type, a name, a model, a vendor URL, or the like of this device.

In step S15, the device specifying module 262 extracts a feature amount (for example, a color, a character, a size, an accessory, an apparatus, a mechanism, or the like) of the device by image recognition of the device for which the designation has been accepted. The device specifying module 262 specifies the device based on the extracted feature amount. The device specifying module 262 specifies product information of the device, for example, by comparing feature amounts stored in an external database or feature amounts stored in a database of the operator terminal 200 with the extracted feature amount. In such a database, it is sufficient that at least the feature amount and product information are associated with each other. Instead of the database, the device specifying module 262 may specify the product information based on the extracted feature amount by referring to an external site or the like in which a part or the whole of the product information and the feature amount are stored in association with each other. Furthermore, the device specifying module 262 may specify the product information by other configurations.

In step S15, the device specifying module 262 specifies the product information by reading an information code such as a one-dimensional code or a two-dimensional code provided in the device for which that the designation has been accepted. The device specifying module 262 may specify the product information of the device by referring to a database or the like associated with the read information code, or may specify the product information of the device by accessing an external site or the like included in the read information code.

The data transmitting/receiving module 250 acquires device information such as a description, an operation method manual, a past operation history, or the like of the specified device based on the product information of the device (step S16). In step S16, the data transmitting/receiving module 250 acquires the device information of the device corresponding to the product information by referring to an external database, a manufacturer website, or the like.

The display module 260 displays the acquired device information (step S17). In step S17, the display module 260 displays the device information by superimposing, in the shared screen, the device information on the device for which the designation has been accepted. The display module 260 may display the device information in an area different from the shared screen area. In addition, the display module 260 may be configured to display the device information by sound or the like, or may be configured to display the device information by other configurations.

Figure 5:
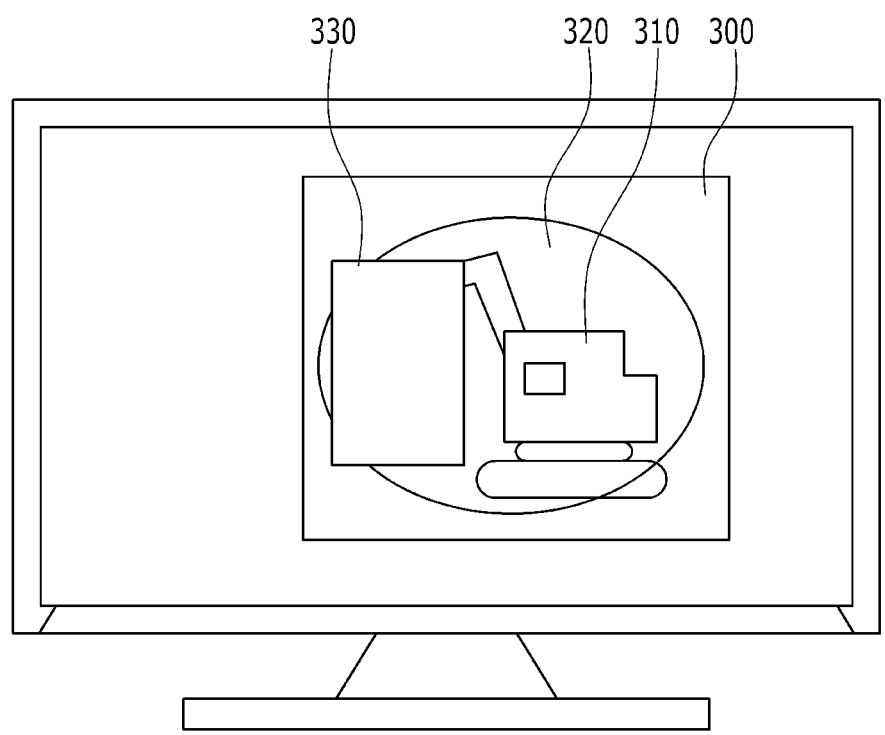
FIG. 5 is a diagram showing an example of device information displayed by an operator terminal 200.

Device information displayed by a display module 260 is described with reference to FIG. 5. FIG. 5 is a diagram showing an example of device information displayed by a display module 260. In FIG. 5, the display module 260 displays a shared screen area 300, a device 310, a designation icon 320, and a device information display area 330. The shared screen area 300 is an area for displaying a captured image to be shared. The device 310 is a device appearing on the captured image. The designation icon 320 is an icon that encloses an object for which a designation accepting module 261 has accepted an input. The device information display area 330 is an area for displaying acquired device information. The designation icon 320 is not limited to a circle, a rectangle, or the like, but may be appropriately changed as long as it indicates a designated portion or the device, like an arrow or highlight.

The display module 260 displays the device information of the device 310 designated by the designation icon 320 in the device information display area 330. The display module 260 displays the device information display area 330 so as to be superimposed on the device 310. The display module 260 may display the device information display area 330 in an area different from the shared screen area 300. In this case, for example, it is possible to clarify that device information of which device is displayed, by a leader line or the like.

The data transmitting/receiving module 250 transmits the device information to the information terminal 100 (step S18).

A display module 161 displays the device information (step S19). In step S19, the display module 161 displays the device information by superimposing the device information on the device, appearing on the screen, for which the designation has been accepted by the operator. In step S19, the device information displayed by the information terminal 100 is the same as the device information displayed by the operator terminal 200 in the above-described step S17. That is, it is sufficient that at least an icon for indicating which device is designated by the operator and the device information are displayed.

While it has been described above that the information terminal 100 and the operator terminal 200 constitute the captured image sharing system 1, a server may be added. In this case, the server may be configured to execute the functions of the device specifying module 262, the data transmitting/receiving module 150, and the data transmitting/receiving module 250 described above. For example, the server may execute specifying the product information, acquiring the device information, or the like. That is, the server may specify the device and acquire the device information, and transmit the device information to the information terminal 100 and the operator terminal 200 so as to be displayed on the respective display units. Furthermore, the server may execute processes other than the examples described above.

The functions described above are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer through a communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: captured image sharing system, 100: information terminal, 200: operator terminal

What is claimed is:

1. A captured image sharing system that shares a captured image captured by an information terminal with an operator terminal connected via a network, the captured image sharing system comprising:
   a display device; and
   a processor that:
      recognizes a line of sight of an operator for a device appearing on a captured image displayed by the operator terminal, and accepts a designation for a part or a whole of the device in accordance with whether the line of sight stays at a specific portion of the device for a predetermined time;
      specifies the device for which the designation has been accepted; and
      displays device information of the specified device on the display device of the operator terminal,
   wherein the processor accepts the designation for the part of the device when the line of sight stays at the specific portion for the predetermined time, and accepts the designation for the whole of the device when the line of sight is directed to a plurality of portions of the device.

2. The captured image sharing system of claim 1, wherein the processor specifies the device for which the designation has been accepted by image recognition.

3. The captured image sharing system of claim 1, wherein the processor specifies the device for which the designation has been accepted by reading an information code provided in the device.

4. The captured image sharing system of claim 1, further comprising
   a second display device; and
   a second processor displays the specified device information on the second display device of the information terminal.

5. A captured image sharing method that shares a captured image captured by an information terminal with an operator terminal connected via a network, the method comprising:
   recognizing a line of sight of an operator for a device appearing on a captured image displayed by the operator terminal, and accepting a designation for a part or a whole of the device in accordance with whether the line of sight stays at a specific portion of the device for a predetermined time;
   specifying the device for which the designation has been accepted; and
   displaying device information of the specified device on the operator terminal,
   wherein the designation for the part of the device is accepted when the line of sight stays at the specific portion for the predetermined time, and the designation for the whole of the device is accepted when the line of sight is directed to a plurality of portions of the device.

6. A non-transitory computer-readable recording medium that stores a program for causing a captured image sharing system that shares a captured image captured by an information terminal with an operator terminal connected via a network to execute:

recognizing a line of sight of an operator for a device appearing on a captured image displayed by the operator terminal, and accepting a designation for a part or a whole of the device in accordance with whether the line of sight stays at a specific portion of the device for a predetermined time;

specifying the device for which the designation has been accepted; and displaying device information of the specified device on the operator terminal, wherein the designation for the part of the device is accepted when the line of sight stays at the specific portion for the predetermined time, and the designation for the whole of the device is accepted when the line of sight is directed to a plurality of portions of the device.

7. The captured image sharing system of claim 1, wherein the processor accepts the designation for the whole of the device when the line of sight is directed to the plurality of portions without staying for the predetermined time, and accepts a designation for the plurality of portions of the device when the line of sight stays at the plurality of portions for the predetermined time.

8. The captured image sharing method of claim 5, wherein the designation for the whole of the device is accepted when the line of sight is directed to the plurality of portions without staying for the predetermined time, and a designation for the plurality of portions of the device is accepted when the line of sight stays at the plurality of portions for the predetermined time.

9. The non-transitory computer-readable recording medium of claim 6, wherein the designation for the whole of the device is accepted when the line of sight is directed to the plurality of portions without staying for the predetermined time, and a designation for the plurality of portions of the device is accepted when the line of sight stays at the plurality of portions for the predetermined time.

\* \* \* \* \*